UNITED STATES PATENT OFFICE.

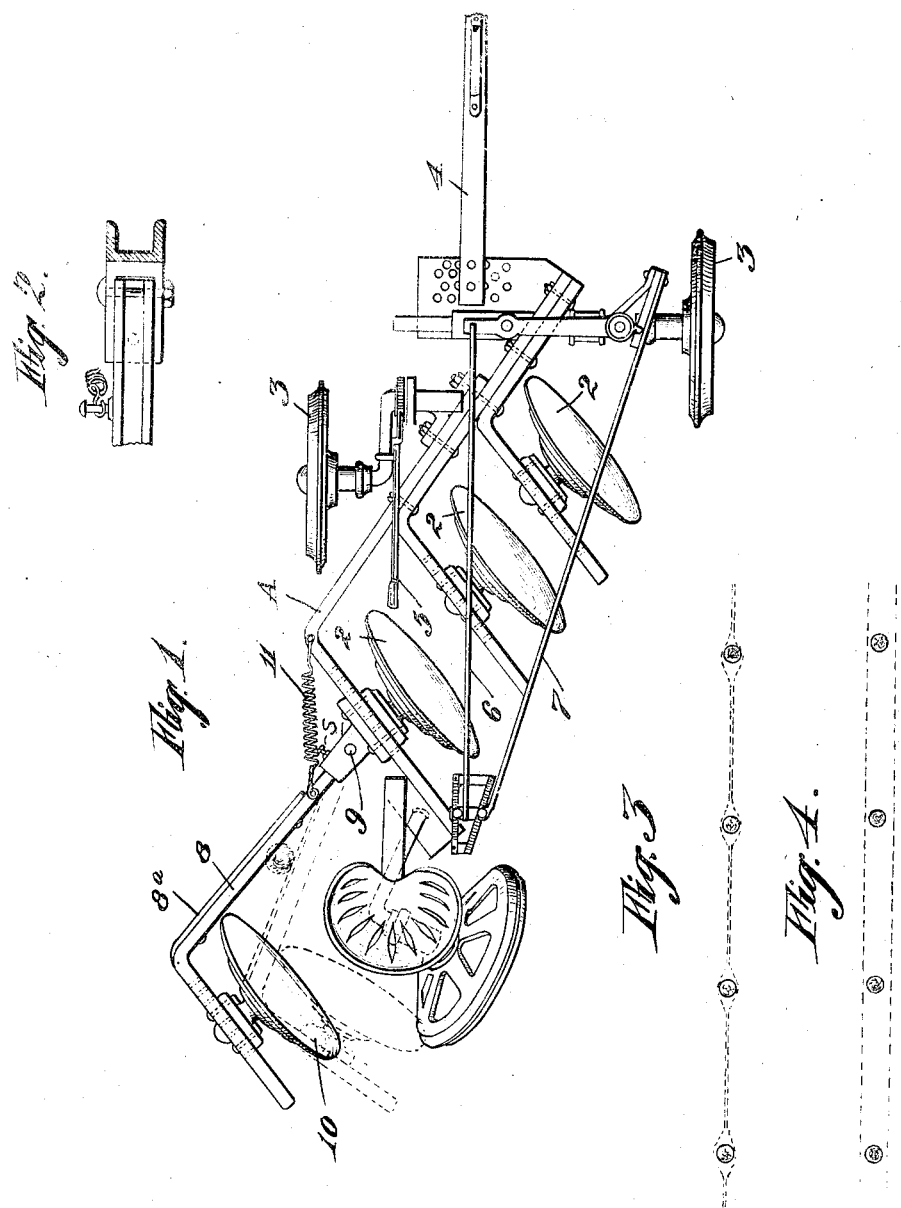

CHARLES J. DALY, OF BENICIA, CALIFORNIA, ASSIGNOR TO BENICIA IRON WORKS, OF BENICIA, CALIFORNIA, A CORPORATION OF NEVADA.

DISK PLOW.

963,525.  Specification of Letters Patent.  Patented July 5, 1910.

Application filed July 7, 1909. Serial No. 506,397.

*To all whom it may concern:*

Be it known that I, CHARLES J. DALY, a citizen of the United States, residing at Benicia, in the county of Solano and State of California, have invented new and useful Improvements in Disk Plows, of which the following is a specification.

My invention relates to improvements in disk plows, and is particularly adapted to that class of plows which are designed to work in orchards and places between rows of trees or plants of any kind.

It consists in the combination of parts, and in details of construction which will be more fully explained by reference to the accompanying drawings, in which—

Figure 1 is a plan view of the plow. Fig. 2 is a section of the portion showing the swinging beam. Figs. 3 and 4 are diagrammatic views indicating the position of trees or plants, and the manner in which the plow operates.

The class known as disk plows are largely used in plowing and cultivating between rows of trees and plants, but in order to protect the same from injury by contact from the plow, it has hitherto been necessary to leave certain spaces in the lines of the rows which are uncultivated, and these must be afterward either cultivated by hand or by supplemental transverse plowing.

It is the object of my invention to overcome this difficulty, and to provide a plow which will substantially do all the work when once driven through the rows.

As shown in the drawings, A represents the plow-beams, with disks 2 which may be of any suitable or desired number. This frame and disks are mounted upon bearing-wheels 3 in the usual manner, having the draft pole 4 with suitable connections, and the lever 5 by which the plows may be raised or depressed. The rods 6 and 7, and connecting lever serve to change the line of draft of the right-hand steering-wheel; these not being essentially different from other forms of this class of plow.

In my invention I have shown a supplemental beam 8 pivoted to the main frame as shown at 9, and adjusted by a set screw or otherwise so that the disk 10 which is carried by the rear end of the beam 8 will normally travel so as to cut to the center of the row between the trees. This arm is held in place by a spring 11 which normally draws it into the position described. The angle of the beam may have a soft protecting shoe $8^a$ which will prevent its injuring the trees. When the plow is traveling between the rows of trees, this beam 8 will be drawn over by the action of the spring so that the disk 10 will plow the space between the trees. As soon as a tree is reached and the angle of the lever strikes a tree, it will be forced into the line of travel of the other plows temporarily, and will pass around the tree as indicated in Fig. 3, plowing very closely to the tree. As soon as the beam has passed the tree, the spring 11 will act to again draw it to its normal position of travel, and thus the ground between the trees will be fully plowed during the single passage of the plow through the rows. Thus, it will be seen that by plowing first upon one side of a row of trees, and then down upon the other side, the ground between the trees will all be plowed as indicated.

It will be manifest that any form of plow capable of doing the work may be employed; the essence of the invention lying in the swinging plow carrying beam 8.

Having thus described my invention, what I claim and desire to secure by Letters Patent is—

1. The combination with a plow beam and a main plow carried thereby, of a supplemental beam secured at its front end to the rear portion of the main beam and extending at an angle rearwardly from the first-named beam and carrying a supplemental plow, said supplemental beam being pivotally secured to the main beam at its inner end, and a spring connection between the main and supplemental beams adapted to permit the supplemental beam to yield when it contacts with a tree or other obstruction to thereby allow the supplemental plow to temporarily swing out to its normal line of travel, said spring returning the supplemental beam and its plow to normal position after the obstruction has been passed.

2. The combination with a main beam and a plow carried thereby, of a supplemental beam secured at its front end to the rear portion of the main beam and extending at an angle rearwardly from the main beam and pivotally connected to the latter, a supplemental plow carried by the second-named beam, and a spring acting upon the supplemental beam to hold it in normal position, said spring yielding to allow the beam to be depressed out of its normal line of travel when it contacts with a tree or other obstruction, and said spring serving to return the supplemental beam to normal position after the obstruction has been passed.

3. The combination with a main beam, disk plows carried thereby, a supplemental beam secured at its front end to the rear portion of the main beam and extending at an angle rearwardly from the main beam and pivotally connected to the latter, a disk plow carried by the supplemental beam, a spring connecting with the supplemental beam at a point between the pivoted end thereof and the outer end and serving to hold the supplemental beam in normal position, said spring yielding to permit the supplemental beam to swing out of its normal line of travel, when said supplemental beam contacts with a tree or other obstruction, and said spring returning the supplemental beam to normal position after the obstruction has been passed, and a protecting shoe on the front surface of the supplemental beam.

In testimony whereof I have hereunto set my hand in the presence of two subscribing witnesses.

CHARLES J. DALY.

Witnesses:
JOHN J. HAYDEN,
WM. H. RULOFSON.